May 26, 1931.  F. Q. SCHWARTZ  1,807,258
METHOD OF MAKING LOCK WASHERS
Filed Feb. 25, 1929
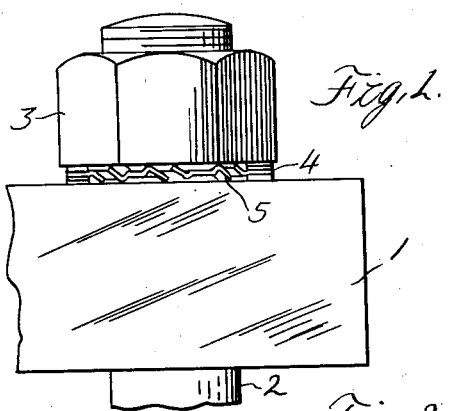
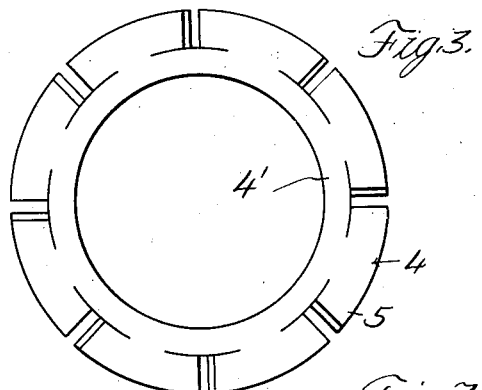
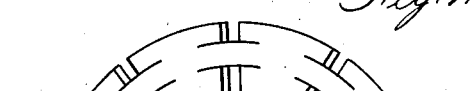
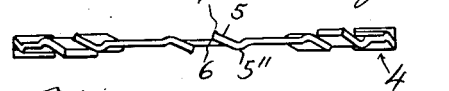
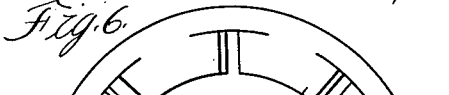
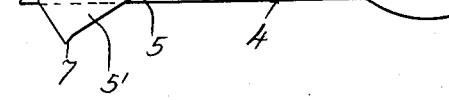
INVENTOR
Frank Q. Schwartz
BY Whittemore Hulbert Whittemore Belknap
ATTORNEYS Patented May 26, 1931

1,807,258

UNITED STATES PATENT OFFICE

FRANK Q. SCHWARTZ, OF DETROIT, MICHIGAN

METHOD OF MAKING LOCK WASHERS

Application filed February 25, 1929. Serial No. 342,569.

This invention relates generally to lock washers and consists of certain novel features of construction, combinations and arrangements of parts that will be hereinafter more fully described and particularly pointed out in the appended claims.

In the accompanying drawings—

Figure 1 is a fragmentary side elevation of a support, bolt and nut, and showing a lock washer embodying my invention applied thereto;

Figure 2 is a detail elevation of the lock washer shown in Figure 1;

Figure 3 is a plan view of the washer shown in Figure 2;

Figure 4 is a fragmentary enlarged section of a lock washer before the pressed out tongues are reversely bent;

Figure 5 is a view similar to Figure 4 but showing the tongues reversely bent;

Figure 6 is a view similar to Figure 3 but showing a slightly modified construction;

Figure 7 is a view similar to Figure 6 but showing another modification;

Figure 8 is a view similar to Figure 7 showing still another modification.

Referring now to the drawing,—1 is a support, 2 is a bolt, 3 is a nut, and 4 is a lock washer embodying my invention. As shown the lock washer 4 surrounds the shank of the bolt between the support 1 and nut 3 and comprises an annulus 4', preferably of sheet metal, having reversely bent pressed out portions or tongues 5 with successive tongues extending in opposite directions with respect to the plane of the annulus and engaging the upper face of the support and the lower face of the nut respectively.

In the present instance the tongues 5 are struck out or pressed from the annulus 4' as illustrated in Figure 4 by a suitable punch and cooperating die (not shown), successive tongues being punched or pressed in opposite directions with respect to the annulus. In this connection I have found that the transverse edges 7 of the tongues extending at right angles to the direction of punch and produced by the punch and die during this pressing operation are relatively sharp, in fact much sharper than the opposite transverse edges 6, hence I have bent the struck out tongues back across the plane of the annulus as illustrated in Figure 5 so that the sharp edges 7 produced by the punch and die will be exposed and in operative position upon opposite sides of the annulus to engage and bite into the opposed faces of the support 1 and nut 3 and thereby effectively prevent movement of the nut relative to the support.

In practice tongues such as 5 may be pressed from the washer at the outer edge thereof as illustrated in Figure 3, or at the inner edge thereof as illustrated in Figure 6, or from the center of the washer as illustrated in Figure 8, or from the washer at both the inner and outer edges as illustrated in Figure 7. In each instance, however, the tongues 5 are reversely bent so that the sharp edges 7 produced by the punches or dies are exposed to engage the nut so that effective gripping action by the tongues is obtained.

In use, when a washer such as 4 is clamped between two bodies such as the support 1 and nut 3, the outer end portions 5' of the tongues 5 will engage the opposed faces of the support and nut, and due to their resiliency and formation will yield toward the plane of the washer until the rounded inner end portions 5'' of the tongues engage the said opposed faces of the support and nut, whereupon engagement of these parts will tend to straighten out the tongues 5 and will thereby cause the sharp edges 7 already in engagement with the support and nut to bite further into these parts to effect a still tighter locking engagement therewith.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The method of forming lock washers having substantially L-shape tongues including the steps of pressing tongues in one direction from a substantially flat blank, and bending the free end portions of said tongues in the opposite direction so that the tongues extend diagonally through openings formed by the pressing operation and so that edges of the tongues formed by the pressing operation project laterally beyond the blank for gripping engagement with a suitable surface.

2. The method of forming lock washers including the steps of pressing in one direction from a substantially flat blank a substantially straight tongue having a free end, and then pressing the portion of the tongue in the opposite direction past the plane of the body so that the free end aforesaid will project laterally from one side of the blank, and a portion of the tongue at the inner end thereof will project laterally from the opposite side of the blank for engagement with another object.

3. The method of forming lock washers including the steps of pressing in one direction from a substantially flat blank a tongue having a free end provided upon the side nearest the blank with a transversely extending edge disposed at substantially right angles to the direction of pressing, and then pressing a portion of the tongue in the opposite direction past the plane of the blank so that the free end aforesaid will project laterally from one side of the blank and the transverse edge aforesaid will be farthest from the blank and will be exposed for locking engagement with another object, and so that a portion of the tongue at its inner end will project laterally from the opposite side of the blank for engagement with another object.

In testimony whereof I affix my signature.

FRANK Q. SCHWARTZ.